(12) United States Patent
Mizuguchi

(10) Patent No.: US 11,514,281 B2
(45) Date of Patent: Nov. 29, 2022

(54) SHEET DISCHARGING APPARATUS AND IMAGE FORMING APPARATUS

(71) Applicant: CANON KABUSHIKI KAISHA, Tokyo (JP)

(72) Inventor: Kohei Mizuguchi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/326,495

(22) Filed: May 21, 2021

(65) Prior Publication Data
US 2021/0374491 A1   Dec. 2, 2021

(30) Foreign Application Priority Data

May 29, 2020   (JP) .............................. JP2020-093912

(51) Int. Cl.
*G06K 15/00* (2006.01)
*G06K 15/16* (2006.01)
*G03G 15/00* (2006.01)
*G06K 15/14* (2006.01)

(52) U.S. Cl.
CPC ......... *G06K 15/16* (2013.01); *G03G 15/6529* (2013.01); *G06K 15/14* (2013.01); *G06K 15/4025* (2013.01); *G06K 15/4065* (2013.01)

(58) Field of Classification Search
CPC .... G06K 15/16; G06K 15/14; G06K 15/4025; G06K 15/4065; G03G 15/6529
See application file for complete search history.

(56) References Cited

U.S. PATENT DOCUMENTS

| | | | |
|---|---|---|---|
| 9,592,992 B2 | 3/2017 | Mizuguchi et al. | |
| 9,950,885 B2 | 4/2018 | Mizuguchi | |
| 2010/0301546 A1* | 12/2010 | Ninomiya | B65H 5/062 271/253 |
| 2012/0112402 A1* | 5/2012 | Onishi | B65H 85/00 271/109 |
| 2014/0029998 A1* | 1/2014 | Takemoto | B65H 29/52 399/405 |
| 2018/0170701 A1 | 6/2018 | Mizuguchi | |
| 2018/0339872 A1 | 11/2018 | Mizuguchi | |
| 2021/0101768 A1 | 4/2021 | Mizuguchi | |

FOREIGN PATENT DOCUMENTS

JP   2005-280856 A   10/2005

\* cited by examiner

*Primary Examiner* — Moustapha Diaby
(74) *Attorney, Agent, or Firm* — Venable LLP

(57) ABSTRACT

A sheet discharging apparatus includes a sheet supporting portion supporting a sheet discharged out of a nip portion nipping the sheet and a guide portion provided opposed to an upper surface of the sheet fed out of the nip portion. The guide portion includes a fixed restricting portion restricting a rear end of the sheet with respect to a sheet discharging direction to moving upward away from an extension line in a sheet discharging direction of the nip portion after passing through the nip portion.

26 Claims, 12 Drawing Sheets

SHEET DISCHARGING APPARATUS AND IMAGE FORMING APPARATUS

FIELD OF THE INVENTION AND RELATED ART

The present invention relates to a sheet discharging apparatus for discharging a sheet, and an image forming apparatus for forming an image on a sheet of recording medium.

Regarding an image forming apparatus such as a printer, a copier, and a multifunction image forming apparatus, after the formation of an image on a sheet of recording medium by an image forming apparatus, the sheet is discharged out of the main assembly of the image forming apparatus by discharge rollers or the like, into a delivery section, such as a delivery tray, of the image forming apparatus, in such a manner that it is laid upon the sheets in the delivery section. There is disclosed in Japanese Laid-open Patent Application No. 2005-280856, a sheet guiding member structured so that sheets of recording medium can be stacked on its top surface. This sheet guiding member is positioned on the top side of the sheet stacking portion which is on the top side of the image forming apparatus. Further, it has an internal sheet reversing passage for placing a sheet upside down when the image forming apparatus is in the two-sided mode. Further, it is provided with an internal reversal passage for placing a sheet of recording medium upside down when the image forming apparatus is in the two-sided mode.

It sometimes occurs that as two or more sheets of recording medium are discharged in succession out of the main assembly of an image forming apparatus, the sheet passage of an image forming apparatus is blocked by the rear end portion of the preceding sheet, and therefore, the front portion of the next sheet collides with the rear end portion of the preceding sheet. Collision of the front end of a trailing sheet of recording medium with the rear end portion of the preceding sheet is one of the causes of the problem that sheets are unsatisfactorily stacked in the delivery tray.

SUMMARY OF THE INVENTION

Thus, the primary object of the present invention is to provide a sheet delivery apparatus which is capable of preventing unsatisfactory stacking of sheets of recording medium in the delivery tray of an image forming apparatus, and an image forming apparatus which is compatible with such a sheet delivery apparatus.

According to an aspect of the present invention, there is provided a sheet discharging apparatus comprising: a discharging portion provided with a nip portion in which a sheet is nipped and configured to discharge the sheet through said nip portion; a sheet supporting portion configured to support the sheet discharged by said discharging portion; and a guide portion provided opposed to an upper surface of the sheet fed out of said nip portion, wherein said guide portion includes a fixed restricting portion configured to restrict a rear end of the sheet with respect to a sheet discharging direction to moving upward away from an extension line in the sheet discharging direction of said nip portion after passing through said nip portion.

Further features of the present invention will become apparent from the following description of exemplary embodiments (with reference to the attached drawings).

DESCRIPTION OF THE EMBODIMENTS

Hereinafter, the present invention is described with reference to a couple of preferred embodiments of the present invention, along with appended drawings.

In the following description of the present invention, the direction which is perpendicular to a horizontal surface, on which an image forming apparatus is placed, will be referred to as "top-to-bottom direction", and the direction (primary scan direction in image forming operation) which is perpendicular to the direction, in which a sheet of recording medium is conveyed in an image forming apparatus, will be referred to as "sheet width direction".

Embodiment 1

Figure 1:
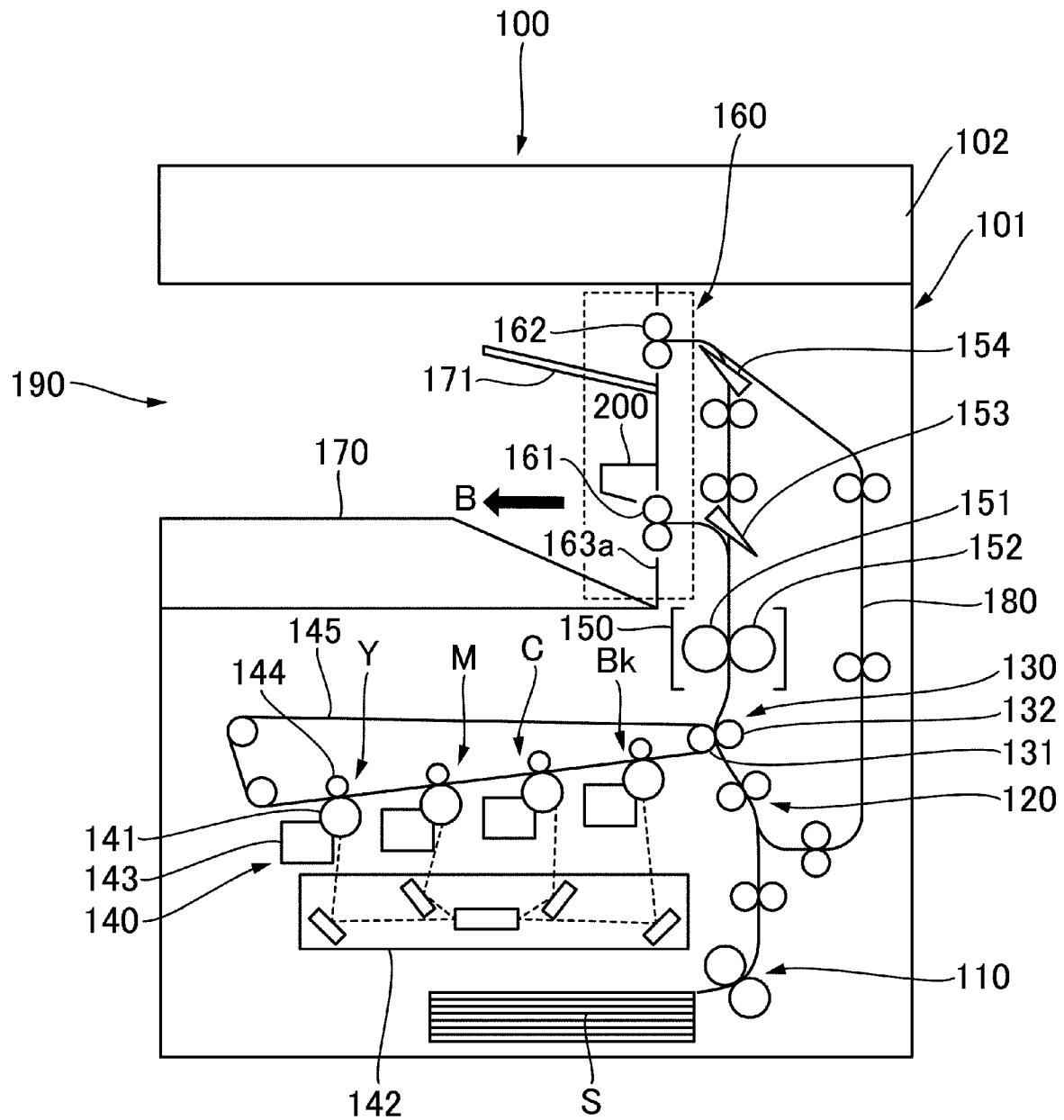
FIG. 1 is a schematic drawing of the image forming apparatus in the first embodiment of the present invention.

FIG. 1 is a schematic sectional view of the image forming apparatus 100 in the first embodiment of the present invention. It shows the structure of the apparatus 100. The image forming apparatus 100 has: an image forming section 140 for forming an image on a sheet S of recording medium; and an apparatus main assembly 101, which functions as a casing for the image forming section 140. The image forming section 140 is an electrophotographic image formation unit of the so-called tandem type, and also, of the intermediary transfer type. More concretely, it has four image formation stations Y, M, C and Bk, which form four monochromatic toner images, one for one, which are different in color. Moreover, it has an intermediary transfer belt 145, along which the four image formation stations are aligned in tandem.

Sheets S of recording medium are stored in layers on the lifting apparatus of sheet conveying apparatus, which is in the bottom portion of the apparatus main assembly 101. They are fed one by one into the apparatus main assembly 101, by a sheet feeder unit 110 as a sheet feeding means. The sheet feeding unit 110 has: a sheet feeder roller for feeding sheets S of recording medium into the apparatus main assembly 101; and a separation roller which is placed in contact with the feed roller to separate the top sheet S from the other sheets S by utilizing the friction between itself and the other sheets S. By the way, as recording medium, various media, for example, ordinary paper, cardstock, plastic film, fabric, surface-treated paper (coated paper), etc., are usable. Also usable as recording medium are envelop, index paper, or the like, which are specific in shape, or different in size and material.

As a sheet S of recording medium is fed into the apparatus main assembly 101 from the feeding unit 110, it is corrected in an oblique movement by an oblique correcting apparatus 120, if it happens to be fed askew. Then, it is conveyed toward the secondary transfer section 130, with such timing that is synchronous with the progression of the toner image formation process carried out by the image forming section 140. The secondary transfer section 130 is a nip which the secondary transfer inside roller 131 and secondary transfer outside roller 132, which roughly oppose each other, form between them, with the presence of the intermediary transfer belt 145 between them. The secondary transfer outside roller 132 is one of the transferring means in this embodiment.

In synchronism with the conveyance of sheet S of recording medium to the secondary transfer section 130 described above, the image forming section 140 carries out the toner image formation process. Each of the image formation stations Y, M, C and Bk of the image forming section 140 has: a photosensitive drum 141 which is an image bearing member (electrophotographic photosensitive member), which is in the form of a drum; a charging means such as a charge roller; and a developing device 143 as a developing means. An exposing apparatus 142 is positioned below the combination of four photosensitive drums 141. The process for forming a toner image is as follows: The charging means uniformly charges the peripheral surface of the photosensitive drum 141. Then, the exposing apparatus 142 writes an electrostatic latent image on the peripheral surface of the photosensitive drum 141, by exposing the peripheral surface of the photosensitive drum 141 in response to the signals modulated with the information of the image to be formed. This electrostatic latent image is developed into a monochromatic toner image by the developing device 142, which is supplied with toner. Consequently, yellow, magenta, cyan and black toner images are formed on the peripheral surfaces of the four photosensitive drums 141, one for one.

The intermediary transfer belt 145 is rotationally driven in the counterclockwise direction of FIG. 1. The four toner images borne by the four photosensitive drums 141, one for one, are sequentially transferred in layers (primary transfer) onto the intermediary transfer belt 145. As a result, a full-color toner image is effected on the intermediary transfer belt 145. Then, the full-color toner image is conveyed to the secondary transfer section 130 by remaining borne by the intermediary transfer belt 145. In the secondary transfer section 130, the full-color toner image is transferred onto a sheet S of recording medium (secondary transfer) by the pressure and electrostatic bias.

After the sheet S is moved through the secondary transfer section 130, it is conveyed to a fixing device 150 as a fixing means. The fixing device 150 has: a pair of rotational members, for example, a combination of rollers, a combination of a roller and belt, or a combination of rollers and belts, and a heat source such as a ceramic heater and halogen lamp. The illustrated fixing device 150 has a pair of rollers, more specifically, a fixation roller 151 as a heating member, and a pressure roller 152 as a pressure applying member, which is kept pressed upon the fixation roller 151 by a preset amount of pressure. The fixing device 150 applies pressure and heat to the toner image on the sheet S, while conveying the sheet S through the nip (fixation nip) between the fixation roller 151 and pressure roller 152. Thus, the toner melts while the sheet S is put through the nip. Then, as the sheet S comes out of the nip, the toner fixes itself as it cools down. Consequently, an image fixed to the sheet S is obtained.

After being put through the fixing device 150, the sheet S is guided by the first switching flap 153, into either a passage which leads to the delivery roller pair 161, or a passage which leads to a reversal roller pair 162. In a case where an image is to be formed on both surfaces of the sheet S, after the formation of an image on one (first) of the two surfaces of the sheet S, the sheet S is guided to the reversal roller pair 162 by the first switching flap 153, and then, is conveyed further by the reversal roller pair 162. As soon as the rear end (in terms of conveyance direction) of the sheet S passes the second switching flap 154, the reversal roller pair 162 reverses the sheet S in conveyance direction, to send the sheet S into the two-sided image formation passage 180. The portion of the sheet S, which protrudes out of the apparatus main assembly 101 while the sheet S is reversed in conveyance direction by the reversal roller pair 162, is supported by a reversal guide 171. As the sheet S arrives at the oblique correcting apparatus 120, for the second time, through the two-sided image formation passage 180, it is corrected in attitude, and adjusted in conveyance timing. Then, it is conveyed through the secondary transfer section 130 and fixing device 150, whereby an image is formed on the other (second) surface of the sheet S.

In a case where the sheet S is to be discharged out of the apparatus main assembly 101, as the sheet S is conveyed out of the fixing device 150, it is guided to the discharge roller pair 161 by the first switching flapper 161. Then, it is discharged out of the apparatus main assembly 101 by the discharge roller pair 161. There is positioned an extension guide unit 200 (which will be described later) on the top side of the sheet outlet opening, where the discharge roller pair 161 is positioned. Thus, while the sheet S is discharged by the discharge roller pair 161, it is restricted in its movement by the extension guide unit 200. Hereafter, the direction in which the sheet S moves when it is discharged by the discharge roller pair 161 will be referred to as sheet discharge direction B (leftward in FIG. 1).

There is positioned a delivery tray 170 as a sheet supporting portion in this embodiment, on the top side of the apparatus main assembly 101. Thus, as a sheet S is discharged out of the apparatus main assembly 101 by the discharge roller pair 161, it falls into the delivery tray 170 in such a manner that it lays itself on the sheets S in the delivery tray 170. The upwardly facing surface of the delivery tray 170 is angled so that, in terms of the sheet discharge direction, its downstream end is higher in position than its upstream end. Thus, as a sheet S is discharged into the delivery tray 170, it is made by its own weight to slide upstream, following the upwardly facing surface of the delivery tray 170. There is provided on the upstream end (in terms of sheet discharge direction) of the delivery tray 170, a sheet aligning surface 163a, which is a part of the apparatus main assembly 101, extending upward from the upstream end of the delivery tray 170. Therefore, as the sheet S slides upstream, following the delivery tray 170, its rear end (in terms of sheet discharge direction B) comes into contact with the sheet aligning surface 163a. Consequently, the sheet S becomes aligned with the preceding sheets S in the delivery tray 170.

By the way, the image forming apparatus 100 is also provided with an image reading apparatus 102, which is positioned on the top side of the apparatus main assembly 101. The image reading apparatus 102 has: a glass platen, on which an original is placed; and an image sensor which reads the image of an original through the glass platen. Further, the image reading apparatus 102 has an automatic original feeding apparatus for feeding, one by one, the originals set in an original placement tray, to make the image sensor read the image of each original. Moreover, the image forming apparatus 100 in this embodiment is provided with an internal sheet delivery space 190, which is between the image forming section 140 and image reading apparatus 102, in terms of the vertical direction. That is, the image reading apparatus 100 is of the so-called internal delivery type. An image forming apparatus of the internal delivery type is advantageous for the following reason, for example. In terms of top view, it is substantially smaller in the area it occupies than an image forming apparatus, the delivery tray 170 of which is positioned on the outward side of one of the exterior walls of the apparatus main assembly 101.

Further, the image forming section 140 described above is one of examples of an image forming means. That is, the present invention is also compatible with an electrophotographic unit of the so-called direct transfer type, which directly (without employment of intermediary transferring member) transfers onto a sheet S of recording medium, a toner image formed on a photosensitive member. Moreover, the compatibility of the present invention is not limited to an electrophotographic image forming apparatus. For example, the present invention is also compatible to a printing unit of the inkjet type, an offset printing system, and the like.

(Extension Guide Unit)

Next, the extension guide unit 200 is described about its structure.

Figure 2:
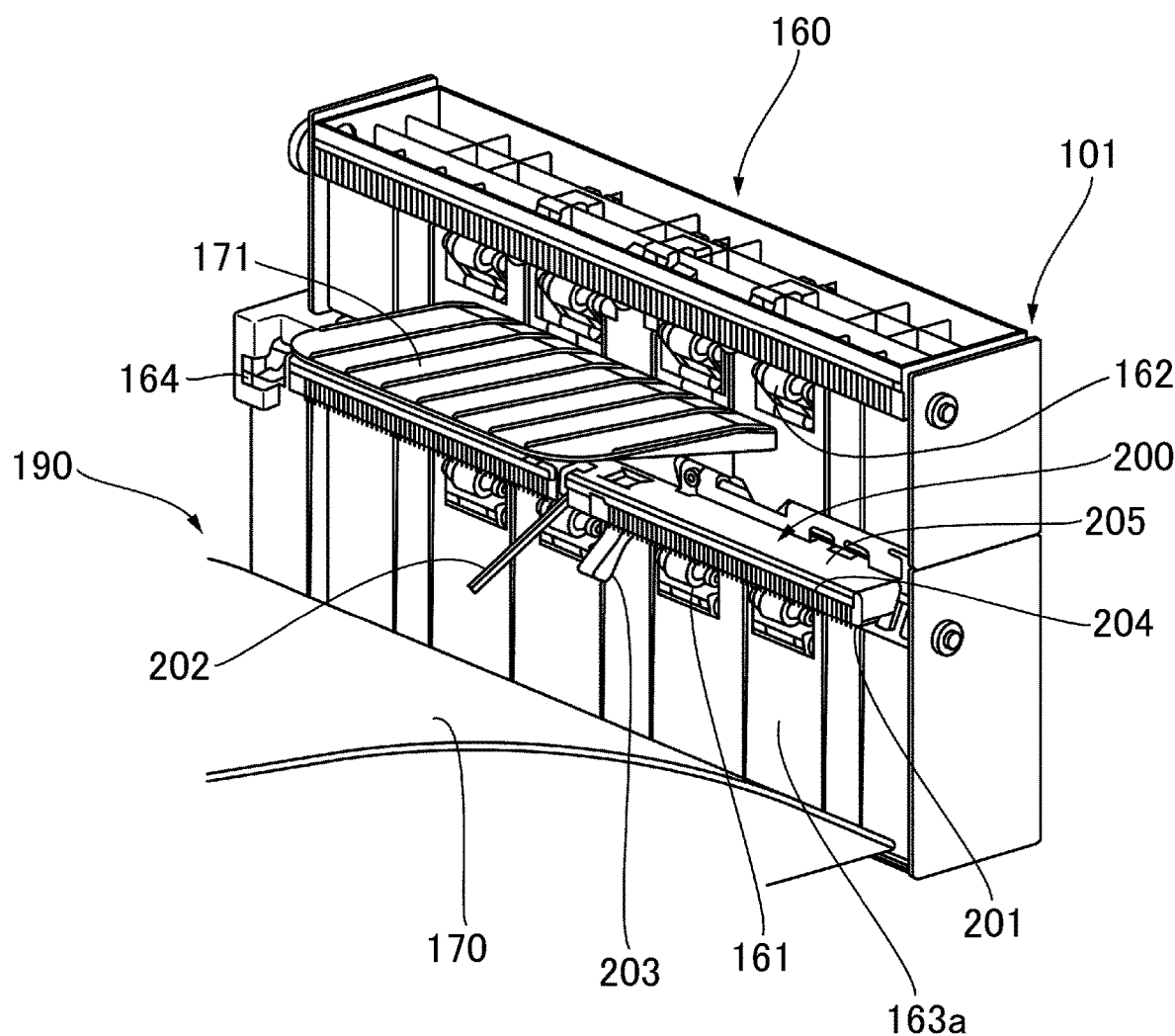
FIG. 2 is a perspective view of the sheet delivery section in the first embodiment, after the removal of the extension guide unit from the sheet delivery section.
Figure 3:
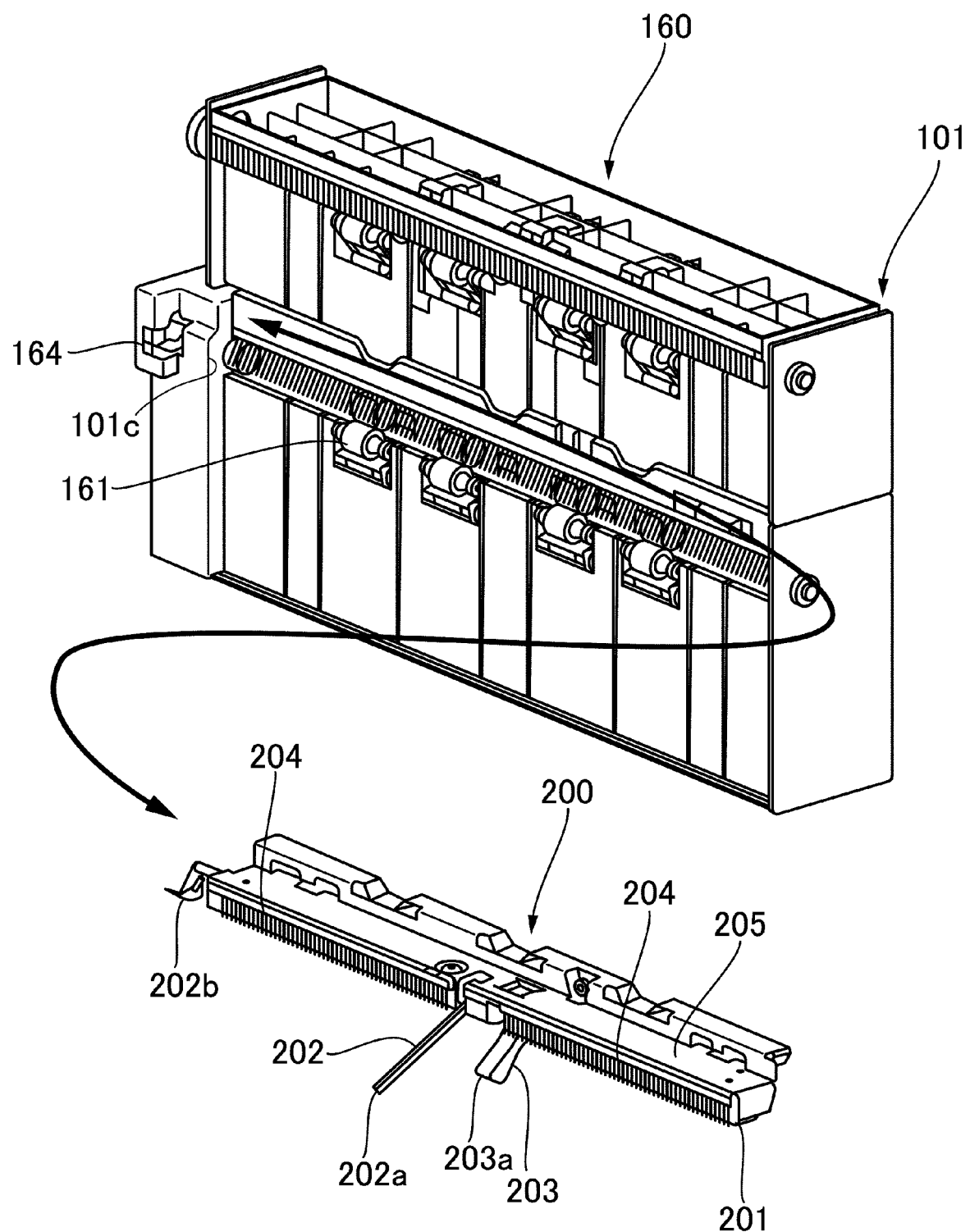
FIG. 3 is a perspective view of the sheet delivery section in the first embodiment.
Figure 4:
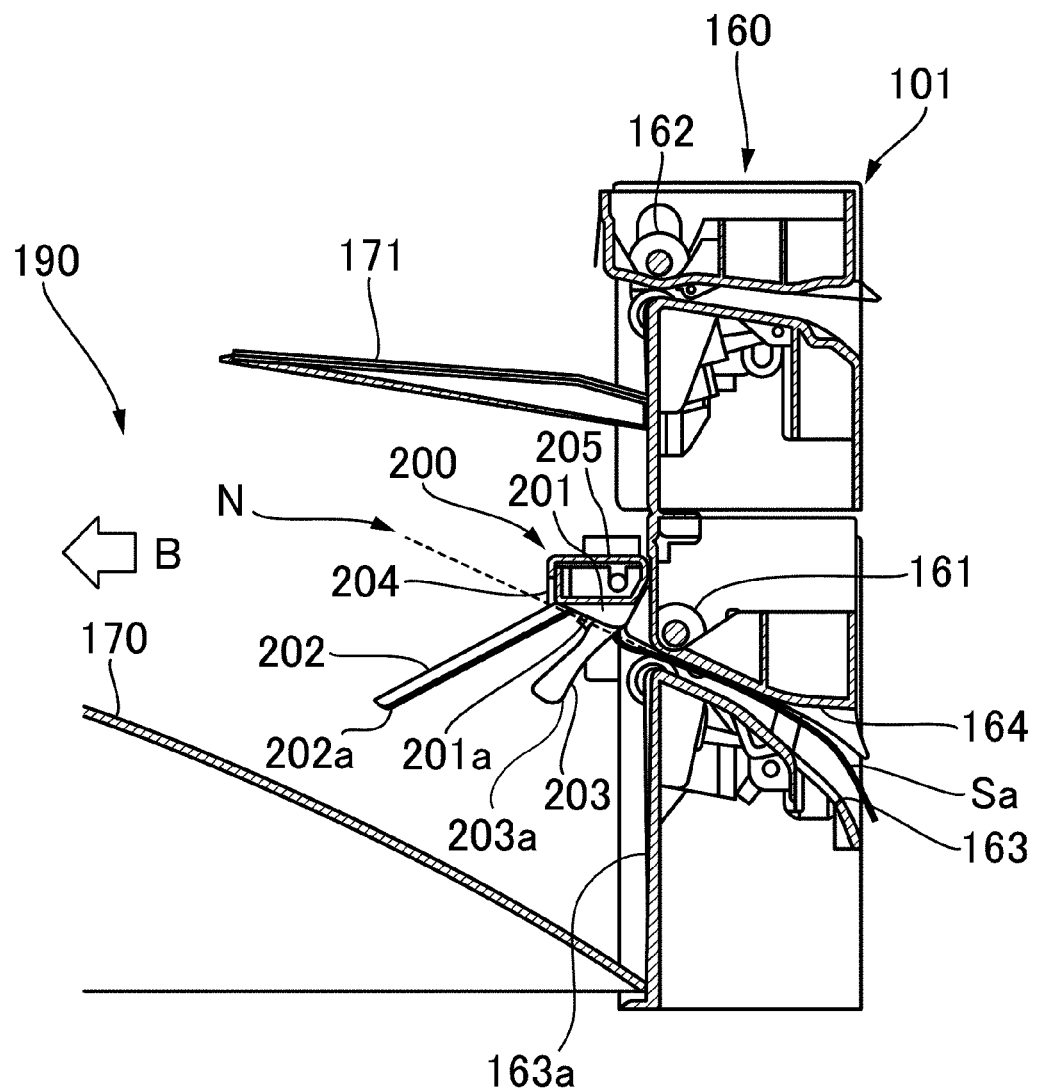
FIG. 4 is a sectional view of the sheet delivery section in the first embodiment.

FIG. 2 is a perspective view of the sheet delivery section 160 in this embodiment. FIG. 3 is a perspective view of a combination of the sheet delivery section 160 (minus extension guide unit 200) as the sheet discharging apparatus in this embodiment, and the extension guide unit 200. FIG. 4 is a sectional view of the sheet delivery section 160 (which will be referred to simply as delivery section).

Referring to FIG. 2, the delivery section 160 is the sheet discharging apparatus in this embodiment. It has the discharge roller pair 161, delivery tray 170, and extension guide unit 200. The discharge roller pair 161 is positioned next to a sheet discharge opening, which is one of the openings of the apparatus main assembly 101. The delivery tray 170 is supported by the apparatus main assembly 101. It is positioned at the bottom of the internal sheet delivery space 190 (FIG. 1). The extension guide unit 200 removably attachable to the portion of the apparatus main assembly 101, which is adjacent to the sheet discharge opening.

By the way, the apparatus main assembly 100 is provided with another opening, which is on the top side of the sheet discharge opening, in the adjacencies of which the discharge roller pair 161 is positioned, and in the adjacencies of which the reversal roller pair 162 is positioned. Moreover, there is positioned the reversal guide 171, on the top side of the extension guide unit 200, in such a manner that, as it is seen from above, it overlaps with the extension guide unit 200.

Referring to FIGS. 2 and 3, the extension guide unit 200 comprises a base 205, a guide 201, a fullness detection flag 202, a rear end pressing flag 203, and a charge removal brush 204.

Referring to FIGS. 2 and 4, the guide 201 has a guiding surface 201a, which faces the upwardly facing surface of a sheet S, as the sheet S is discharged from the apparatus main assembly 101 by the discharge roller pair 161. It is solidly attached to the base 205. The guide 201 is formed of a resinous substance. Its guiding surface 201a is provided multiple ribs, which extend in the direction parallel to the sheet discharge direction. The length of this guiding surface 201a, in terms of the sheet discharge direction B, is set in consideration of the distance, by which a sheet S is discharged by the discharge roller pair 161 from the nip of the discharge roller pair 161. Further, in terms of the sheet width direction, the dimension of the guiding surface 201a is set to be no less than the width of the widest sheet S of recording medium, on which the image reading apparatus 100 is capable of forming an image (widest sheet in terms of specifications of image forming apparatus).

The guide 201 is positioned so that, in terms of the sheet width direction, its guiding surface 201a becomes roughly parallel to the nip line N of the discharge roller pair 161. The discharge roller pair 161 in this embodiment discharges a sheet S at a slightly upward angle relative to the sheet discharge direction B. Thus, the nip line N is angled relative to the horizontal direction, being roughly parallel to the guiding surface 201a. Further, the guide 201 has a slant surface, which is in connection to the upstream side of the guiding surface 201a in terms of the sheet discharge direction B. This surface is angled relative to the guiding surface 201a at such an angle that it gradually approaches to the nip line N from the top side of the nip line N. It has a function of preventing the problem that as a sheet S is discharged by the discharge roller pair 161, its front end portion hangs up on the guide 201.

Further, it is desired that the guiding surface 201a is positioned sufficiently close to the nip line N. For example, it is desired that the smallest distance between the guiding surface 201a and nip line N is no more than 10 mm, preferably, 5 mm, as seen from the direction parallel to the sheet width direction.

By the way, the nip line N is a hypothetical straight line which coincides with the nip of the discharge roller pair 161, in which the sheet S is sandwiched by the discharge roller pair 161. It is perpendicular to the line which coincides with the rotational axis of one of the rollers, and the rotational axis of the other roller. That is, the nip line N is an extension of the nip of the discharging means, such as the discharge roller pair 161, in the sheet discharge direction. In a case where the sheet delivery section 160 is provided with two sets of roller pairs, and structured so that the rollers of one set of discharge roller pair, and those of the other discharge roller pair are alternately positioned, the intersection of the hypothetical straight line which coincides with the point of contact between the two rollers, and the line which coincides with the rotational axes of the two rollers is the nip position, the intersection of the hypothetical straight line drawn between the two intersections between the peripheral surface of one of the pair of rollers and the peripheral surface of the other roller, and the hypothetical straight line drawn between the aforementioned two rotational axes is the nip position.

In terms of the sheet discharge direction B, the charge removal brush 204 is positioned on the downstream side of the guiding surface 201a. It is provided with multiple strands of electrically conductive fiber, or multiple narrow strands of sheet of electrically conductive substance. The charge removal brush 204 is downwardly protrusive relative to the guiding surface 201a. For example, it is positioned so that, as it is seen from the direction parallel to the sheet width direction, it intersects with the nip line N. It is grounded by being placed in contact with the metallic frame of the apparatus main assembly 101 by way of base 205, functioning as a charge removing member for removing electrical charge from the sheet S.

Both of the fullness detection flag 202 and rear end pressing flag 203 are rotatably supported by the guide 201. Each is rotatable about its axis, which is parallel to the sheet width direction. The rotational axis of the fullness detection flag 202, and that of the rear end pressing flag 203, are on the top side of the nip line N. The guide 201 is provided with a slit, through which the rear end pressing flag 203 is allowed to protrude into the top side of the nip line N. When the fullness detection flag 202 and rear end pressing flag 203 are not in contact with a sheet S, their tip remains on the bottom side of the nip line N. As they are pressed by the sheet S, they pivotally move into the top side of the nip line N.

In terms of the sheet width direction, the fullness detection flag 202 and rear end pressing flag 203 are positioned within the path of the narrowest (according to specification of image forming apparatus) sheet S of recording medium, on which an image can be formed by the image forming apparatus 100, roughly at the center of the path. Also in terms of the sheet width direction, however, there is provided a preset distance between the fullness detection flag 202 and rear end pressing flag 203. The fullness detection flag 202 and rear end pressing flag 203 are enabled to pivotally move independently from each other. Further, the fullness detection flag 202 and rear end pressing flag 203 are angled relative to the direction which is perpendicular to the nip line N, at such an angle that, when the fullness detection flag 202 and rear end pressing flag 203 are not in contact with a sheet S, the farther it is from their pivot, the greater the distance between them. The structural arrangement described above makes it possible to reduce the delivery section 160 in the noises which occur as the front end of a sheet S collides with the flags, while avoiding the interference from the fullness detection flag 202 and rear end pressing flag 203 which are pivotally movable members.

The fullness detection flag 202 has a sheet contacting portion 202a, which is located at one of the lengthwise ends of the rotational axle (which is parallel to sheet width direction) of the fullness detection flag 202. The sheet contacting portion 202a is protrusive to the opposite side of the guide 201 from itself, and remains in contact with the upwardly facing surface of the top sheet S of the stacked sheets S in the delivery tray 170. The fullness detection flag 202 has also a light blocking portion 202b, which is located at the other lengthwise end of the rotational axis of the fullness detection flag 202. Further, the apparatus main assembly 101 is provided with a fullness detection sensor 165, which is a photo-interrupter which can be interrupted by the light blocking portion 202b. The fullness detection sensor 165, which is a detecting portion, is structured so that it is switched in detection signal according to the rotational angle of the fullness detection flag 202. That is, the fullness detection sensor 165 and fullness detection flag 202 are structured so that the fullness detection sensor 165 is switched in status (ON/OFF), based on whether or not the aggregate height of all the sheets S in the delivery tray 170 is no more than a preset value. As the control section of the image forming apparatus 100 detects, based on the detection signal from the fullness detection sensor 165, that the delivery tray 170 is full, not only does it interrupt the ongoing image forming operation, but also, informs a user that the sheets S should be removed from the delivery tray 170.

As a sheet S comes out of the nip of the discharge roller pair 161, the rear end pressing flag 203 presses the rear end portion of the sheet S downward to help the rear end portion of the sheet S to fall. The delivery section 160 may be structured so that the rear end pressing flag 203 remains pressed downward by its own weight, or by a spring placed between the guide 201 and rear end pressing flag 203.

By the way, when the fullness detection flag 202 and rear end pressing flag 203 are not in contact with a sheet S, the tip 203a of the rear end pressing flag 203 is on the upstream side of the tip (sheet contacting portion 202a) of the fullness detection sensor 165, because it is desired that the rear end pressing flag 203 presses the rear end portion of the sheet S at a position which is closer to the nip of the discharge roller pair 161 than the rear end pressing flag 203. The minimum distance from the tip 203a of the rear end pressing flag 203 to a delivery tray 170 is set to be less than the minimum distance from the tip (sheet contacting portion 202a) of the fullness detection sensor 165. Therefore, it is avoided that, before it is detected that the delivery tray 170 is full, based on the result of detection by the fullness detection sensor 165, the rear end pressing flag 203 comes into contact with the sheet S on the delivery tray 170, being thereby prevented from properly pressing the rear end portion of the next sheet S as the next sheet S is discharged.

The fullness detection flag 202 is the first flag in this embodiment, whereas the rear end pressing flag 203 is the second flag in this embodiment. By the way, the fullness detection flag 202 may be eliminated. In a case where the fullness detection flag 202 is eliminated, the extension guide unit 200 is provided with only the rear end pressing flag 203.

Referring to FIG. 3, the extension guide unit 200 can be installed into, or uninstalled from, the apparatus main assembly 101 by sliding the base 205 of extension guide unit 200 into, or out of, the base slot in the apparatus main assembly 101. When the base 205 is in its slot in the apparatus main assembly 101, it is prevented from vertically moving, and also, in the sheet discharge direction B.

By the way, it is desired that the portion of the extension guide unit 200, which will be in the adjacencies of the light blocking portion 202b of the fullness detection flag 202 after the installation of the extension guide unit 200, is contoured so that when the extension guide unit 200 is moved in the left-upward direction in FIG. 3 to be installed into the apparatus main assembly 101, the light blocking portion 202b does not collide with the apparatus main assembly 101. The portion of the extension guide unit 200 contoured as described above comes into contact with the apparatus main assembly 101, causing the fullness detection flag 202, which is being kept in its lowest position by its own weight, to upwardly pivot by a preset angle. Therefore, the light blocking portion 202b is prevented from colliding with a corner 101c of the apparatus main assembly 101, for example. The fullness detection sensor 165 is an electrical component, and it is more likely that at least a portion of it is covered with other components. Thus, contouring the extension guide unit 200 as described above makes it possible to prevent the extension guide unit 200 from colliding with the light blocking portion 202b when the delivery section 160 is assembled.

(Post-Processing Apparatus)

Figure 9:
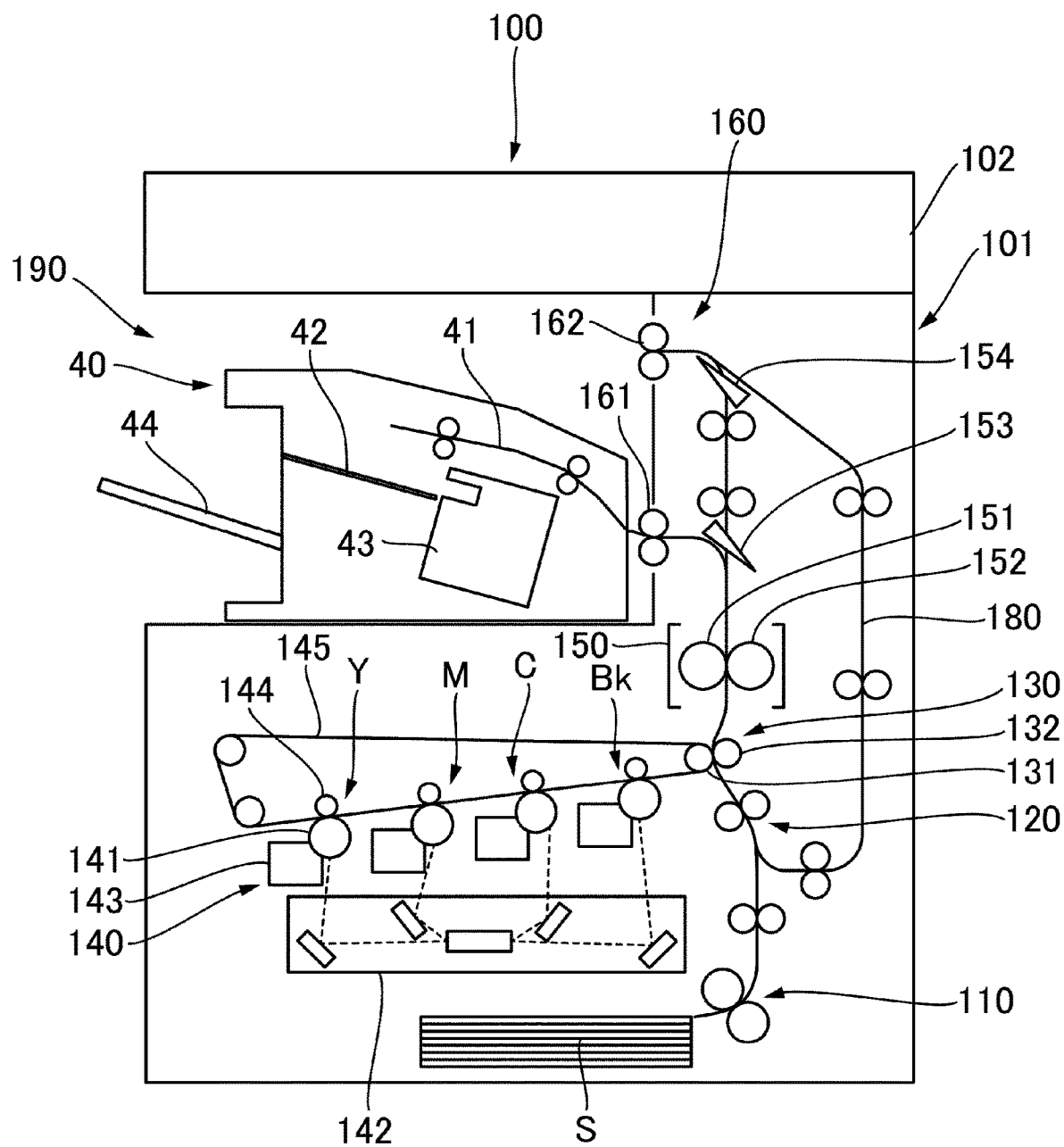
FIG. 9 is a schematic drawing of the image forming apparatus in the first embodiment, fitted with a post-processing apparatus.

Referring to FIG. 9, removing the extension guide unit 200 makes it possible to install the post-processing apparatus 40, which is a sheet processing apparatus, into the internal sheet delivery space 190 of the image forming apparatus 100. In the case of the illustrated example, the image forming apparatus 100 is structured so that as the delivery tray 170 and reversal guide 171 are removed from the apparatus main assembly 101, it becomes possible for the post-processing apparatus 40 to be mounted.

The post-processing apparatus 40 has a sheet passage 41, and an intermediary tray 42. As a sheet S is discharged out of the apparatus main assembly 100 by the discharge roller pair 161 after the formation of an image on the sheet S, the sheet passage 41 catches the sheet S, and conveyed further. The intermediary tray 42 is where the sheet S is temporarily stored as the sheet S is discharged through the sheet passage 41. Further, the post-processing apparatus 40 has a stapler 43 and a delivery tray 44. The stapler 43 is for stapling together a preset number of sheets S as the sheets S are discharged into the delivery tray 170 and aligned in layers. The delivery tray 44 is where the stapled bundles of sheets S are discharged. Here, the post-processing apparatus for processing sheets S after the formation of an image thereon was a stapler 43. However, the present invention is also compatible with an image forming apparatus, the post-processing apparatus 40 of which is a punching unit for punching holes through the sheet S, or a folding unit for folding the sheets S after the image formation thereon.

(Sheet Movement)

Figure 5:
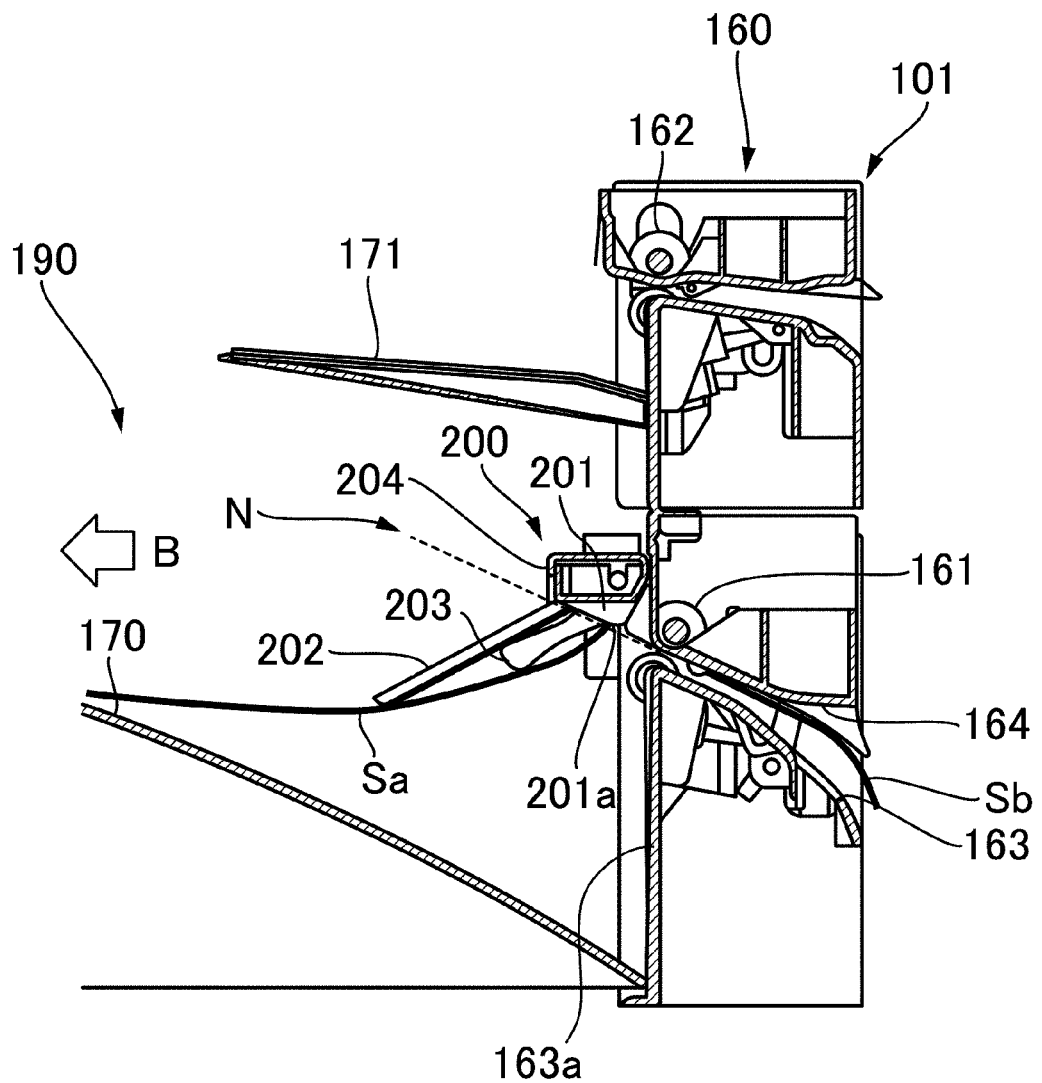
FIG. 5 is also a sectional view of the sheet delivery section in the first embodiment.
Figure 6:
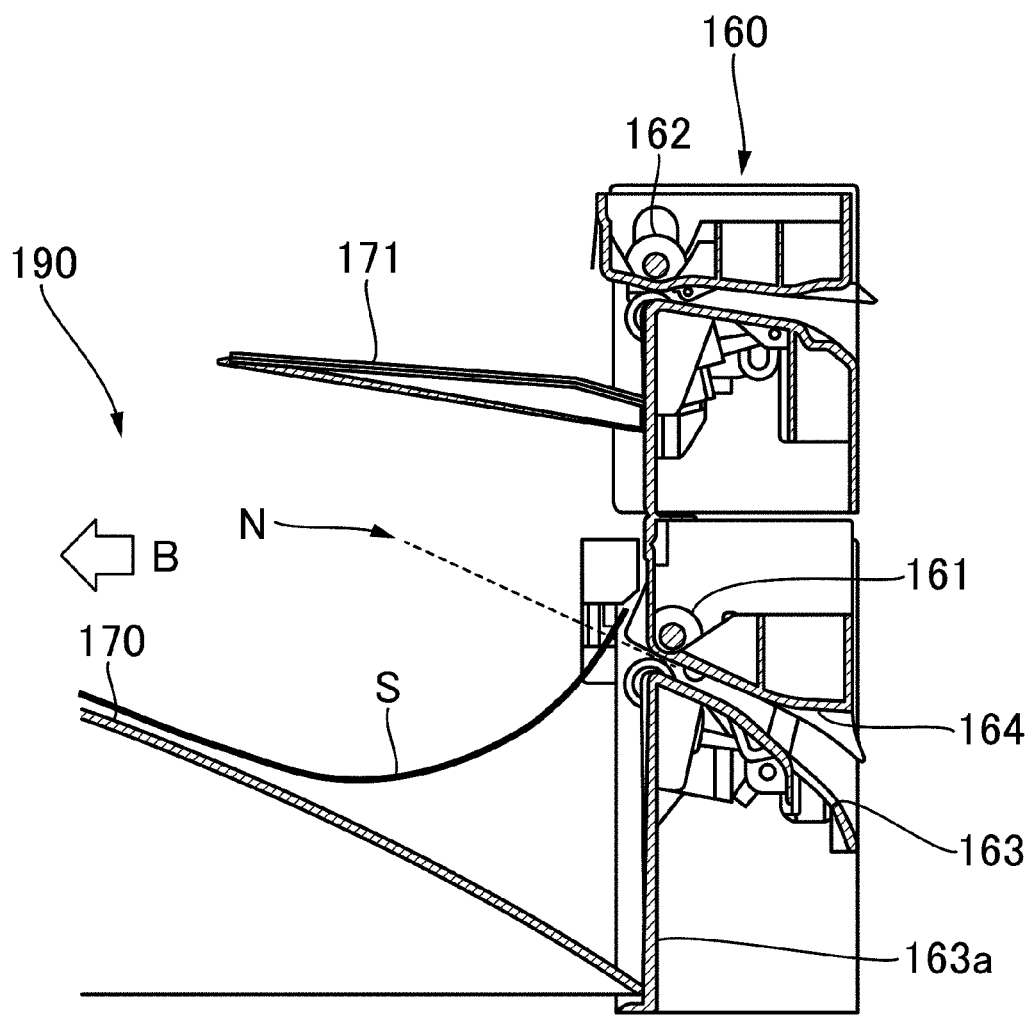
FIG. 6 is a sectional view of the sheet delivery section, prior to the installation of the extension guide unit.

Next, the sheet movement which occurs as a sheet S is discharged from the apparatus main assembly 101 by the discharge roller pair 161 is described. Each of FIGS. 4-6 is a sectional view of the sheet delivery section 160. FIG. 4 shows a state of the sheet delivery section 160 right after the front end of a sheet Sa came out of the nip of the discharge roller pair 161. FIG. 5 shows a state of the sheet delivery section 160 right after the rear end of the first sheet Sa came out of the nip of the discharge roller pair 161. By the way, the portions of the image reading apparatus 100, which are on the upstream side of the delivery section 160 in terms of the sheet conveyance direction are not shown in the drawings.

The sheet discharging operation by the discharge roller pair 161 is as follows: As the sheet Sa is discharged from the fixing device 150 (FIG. 1), it is guided to the nip of the discharge roller pair 161 through a sheet passage formed by a combination of a bottom discharge guide 163 and a top discharge guide 164. Then, it is discharged in the sheet discharge direction B, into the delivery tray 170 which is in the internal sheet discharge space 190 by the discharge roller pair 161. By the way, the bottom discharge guide 163 is an integral part of the sheet aligning surface 163a described above.

As described above, when the rear end pressing flag 203 and fullness detection flag 202 are not in contact with the sheet S, they remain protruding below the nip line N. Therefore, as the front end of the sheet Sa comes out of the nip of the discharge roller pair 161, it moves while sequentially pushing away the rear end pressing flag 203 and fullness detection flag 202. Therefore, while the sheet Sa is discharged, it is subjected by the rear end pressing flag 203 and fullness detection flag 202, to a force which is the same in direction as gravity. However, in the adjacencies of the extension guide unit 200, because of the rigidity of the sheet Sa, the sheet Sa moves roughly along the nip line N, until its rear end comes out of the nip of the discharge roller pair 161. In particular, in this embodiment, there is positioned in the adjacencies of the nip of the discharge roller pair 161, a stiffening member for bending the sheet Sa in such curvature that, as the sheet Sa is seen from the downstream side in terms of the sheet discharge direction B, it looks like a cross-section of the peak portion of a wave. Thus, as the sheet Sa comes out of the nip of the discharge roller pair 161, it remains resistant to bending.

As the distance between the front end of the sheet Sa and stiffening portion increases, the front end portion of the sheet Sa is made to droop by its own weight, coming into contact with the delivery tray 170. Then, the sheet Sa is slid into the delivery tray 170 while its rear end portion remaining upwardly bending in curvature. While the sheet Sa is slid into the delivery tray 170, the highest portion of the upwardly bent portion of the sheet Sa comes into contact with the charge removal brush 204 of the extension guide unit 200. Therefore, the sheet Sa is rid of electrical charge.

Referring to FIG. 5, as the rear end of the sheet Sa comes out of the nip of the discharge roller pair 161, the sheet Sa begins to fall toward the delivery tray 170. Here, as soon as the rear end of the sheet Sa comes out of the nip of the discharge roller pair 161, the sheet Sa becomes free from the discharge roller pair 161, top discharge guide 164, and bottom discharge guide 163. Therefore, the sheet Sa tends to curl in the same manner as it tended to curl after the formation of an image thereon. Further, if the sheet Sa is discharged from the apparatus main assembly 101 while a certain number of sheets S are remaining stacked in the delivery tray 170, the friction between the sheet Sa, which is being discharged, and the sheet in the delivery tray 170, may becomes substantial, although it depends of the extent of curling of the sheet S in the delivery tray 170. Increase in this friction increases the force necessary to convey the sheet Sa. For the reasons such as those described above, it sometimes occurs that as soon as the rear end of the sheet Sa comes out of the nip of the discharge roller pair 161, it moves upward of the nip line N.

In this embodiment, however, the extension guide unit 200 is positioned on the top side of the sheet discharge opening, where the discharge roller pair 161 is positioned. Therefore, the rear end of the sheet Sa is restricted in vertical movement, by the guiding surface 201a of guide 201. That is, the guiding surface 201a functions as a restricting portion for preventing the rear end of the sheet Sa from upwardly moving away from the hypothetical extension of the nip, after it comes out of the nip of the discharging means. Normally, by the time a sheet Sb, as the second sheet, which follows the sheet Secondary scan direction A or the first sheet, arrives at the nip of the discharge roller pair 161, the rear end of the sheet Sa will be on the bottom side of the nip line N.

Figure 7:
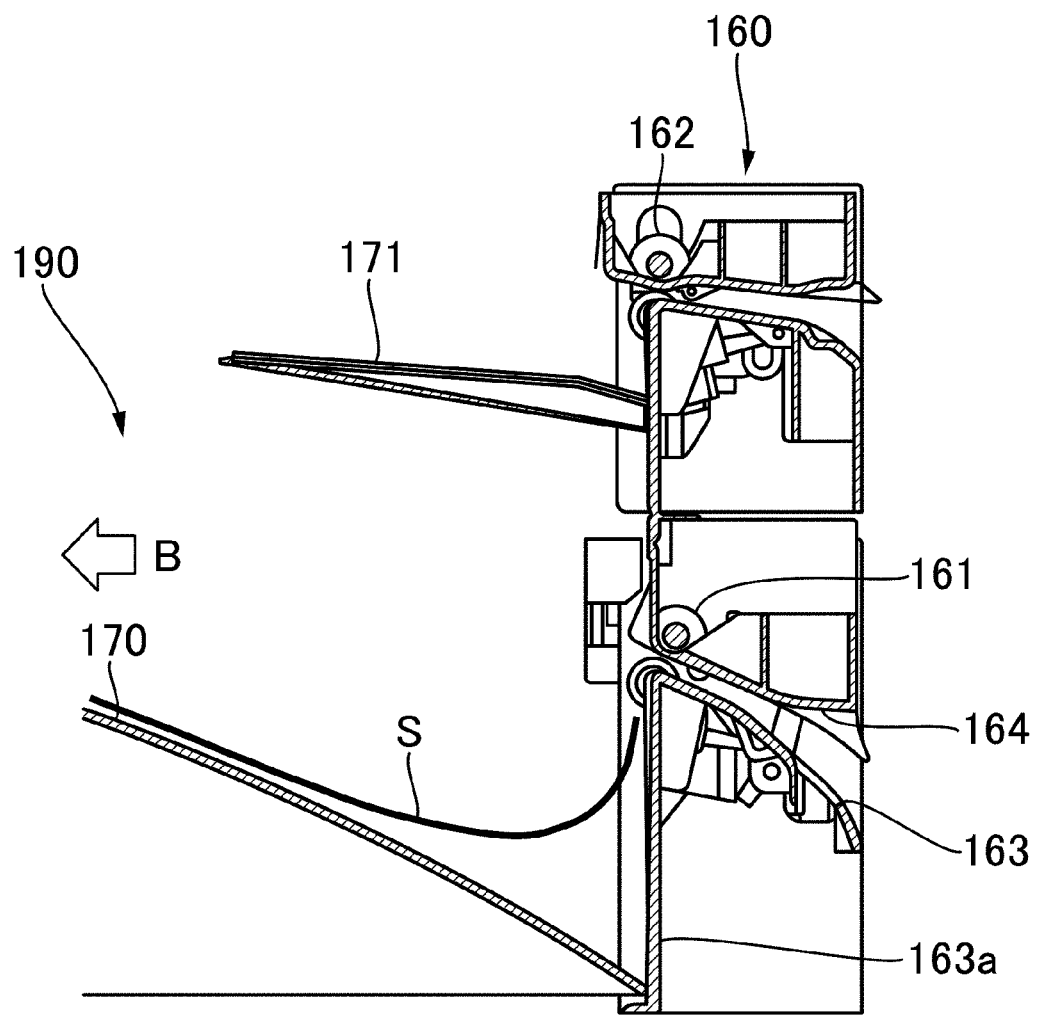
FIG. 7 is a drawing for describing a phenomenon that the rear end portion of a sheet of recording medium remains leaning on the rear wall (in terms of sheet delivery direction) of the delivery tray.
Figure 8:
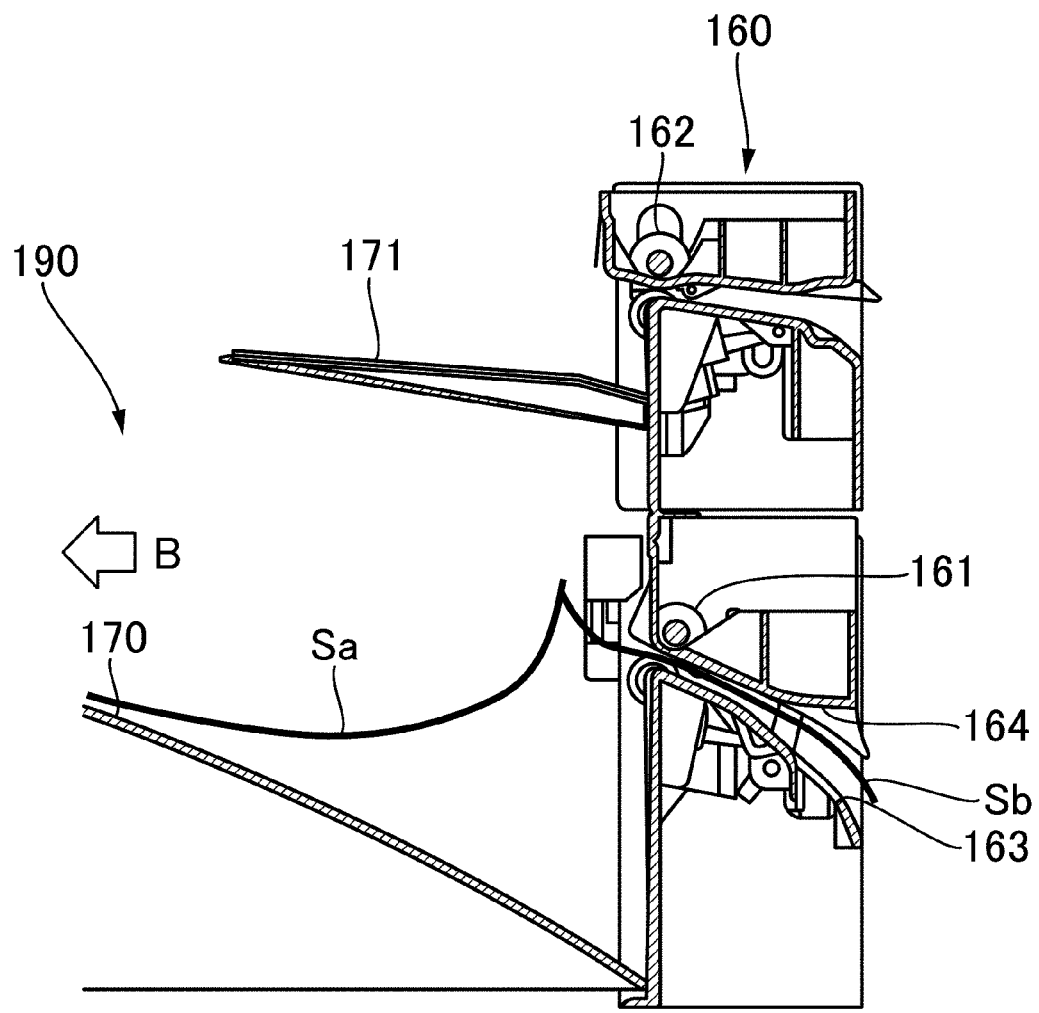
FIG. 8 is a drawing for describing the collision between consecutively delivered two sheets of recording medium.

Next, benefit of providing the delivery section 160 with the guiding surface 201a described above is described with reference to the sheet movement in the delivery section 160 which does not have the extension guide unit 200. Each of FIGS. 6, 7 and 8 is a sectional view of a delivery section 160 which does not have the extension guide unit 200. The structures shown in FIGS. 6-8 are the same as those of the first embodiment, except that they do not have the extension guide unit 200.

FIG. 6 shows the sheet delivery section 160 immediately after the rear end of the first sheet Sa came out of the nip of the discharge roller pair 161. In the case of this structure, the delivery section 160 does not have the extension guide unit 200. Therefore, as the rear end of the sheet Sa comes out of the nip of the discharge roller pair 161, it is possible that as the rear end of the sheet Sa comes out of the nip of the discharge roller pair 161, the rear end of the sheet Sa will move to the top side of the nip line N, because of the curling of the sheet Sa, as shown in FIG. 6. Consequently, the sheet Sa takes such an attitude that its rear end leans on the top discharge guide 164. Then, the sheet Sa falls, with its rear end sliding on the top discharge guide 164. Thus, it takes longer to fall than if its rear end were not sliding on the top discharge guide 164.

Referring to FIG. 7, if the sheet Sa remains leaning on the top discharge guide 164, it sometimes occurs that as the sheet Sa falls on the preceding sheet S in the delivery tray 170, it remains upwardly curled in such an attitude that its rear end remains leaning of the aligning surface 163*a* (rear end leaning). Further, as the sheet Sa leans on the top discharge guide 164, it reduces in the speed at which it falls. Therefore, it sometimes occurs that the front end of the second sheet Sb, or the sheet which is discharged right after the discharging of the first sheet Sa, collides with the first sheet Sa, or the sheet, the front end of which remains leaning on the top discharge guide 164, as shown in FIG. 8, possibly disturbing the sheets S stacked aligned in the delivery tray 170.

In comparison, in the case of the structure in this embodiment described with reference to FIGS. 4 and 5, the extension guide unit 200 is provided as a guiding means having a restricting portion. Therefore, it is prevented that as a sheet S comes out of the nip of the discharge roller pair 161, its rear end moves upward. Therefore, even if sheets S are discharged curled in succession, the rear end leaning, and resultant collision between two sheets which are discharged in succession, do not occur. Therefore, it does not occur that sheets S are unsatisfactorily stacked in the delivery tray 170.

Further, in this embodiment, the image forming apparatus 100 is structured so that the extension guide unit 200 is removably installable in the apparatus main assembly 101. In a case where the discharge roller pair 161 passes the sheet S to the post-processing apparatus 40 (FIG. 9) instead of the delivery tray 170, the rear end leaning or the like does not occur. Therefore, there is little need for restricting the sheet in the movement of its rear end portion by the guiding surface 201*a*. On the other hand, removal of the extension guide unit 200 makes it easy to carry out the operation for installing the post-processing apparatus 40 in the internal sheet discharge space 190 to connect the post-processing apparatus 40 to the sheet discharging opening of the apparatus main assembly 101. Therefore, the structure in this embodiment is superior in versatility to a structure, the extension guide unit 200 of which is a part of the apparatus main assembly 101, for example.

As a replacement for the means for preventing the rear end leaning, and the sheet-to-sheet collision, it is possible to increase the delivery section 160 in the speed with which the sheet S is discharged by the discharge roller pair 161, and/or the interval with which the sheet S is discharged. However, such practices are likely to increase the delivery section 160 in motor noise, and/or reduce the image forming apparatus in productivity. In comparison, in this embodiment, the delivery section 160 is simple in structured in that the extension guide unit 200 is installed in the adjacencies of the sheet discharge opening to prevent the rear end leaning, and/or sheet-to-sheet collision. By the way, the replacement means described above can be combined with the structure in this embodiment.

By the way in this embodiment, the discharge roller pair 161 discharges the sheet S in such an attitude that the image bearing surface of the sheet S remains facing downward. That is, the delivery section 160 in this embodiment is of the so-called face-down discharge type. However, "image bearing surface" means the sheet surface, on which a toner image has just been formed by the image forming section 140 (in two-sided printing mode, second surface of sheet S on which toner is formed). In the two-sided mode, the image bearing surface is heated from the opposite side of the sheet S from the pressing member. Therefore, the sheet S tends to upwardly curl when the sheet S is discharged in the face-down attitude. The sheet delivery section structure in this embodiment described above is preferably applicable to a sheet delivery section of the face-down discharge type.

However, how and how much the sheet S curls after the formation of an image thereon is affected by the operational settings (one-sided or two-sided, sheet interval, image formation speed, etc.), environmental conditions (temperature, humidity, etc.), material for the sheet, etc. It is also affected by the layout of the image forming section 140 (face-down discharged or not, for example), and properties of the mechanism as an image forming means.

Therefore, the application of the structure of the delivery section 160 in this embodiment is not limited to the image forming apparatus 100 in this embodiment described above.

Embodiment 2

Next, the present invention is described with reference to the second embodiment of the present invention. In the first embodiment, the delivery section 160 was structured so that as the sheets S are discharged by the discharge roller pair 161 into the delivery tray 170, they are stacked in the delivery tray 170. In this embodiment, however, a second delivery tray is provided on the top side of the delivery tray 170. That is, this embodiment is different from the first embodiment in that the second delivery tray is similar in function to the extension guide unit 200 in the first embodiment. In the following description of the second embodiment, a component of the second delivery section, which is given the same referential code as the counterpart in the first embodiment is to be assumed to be practically the same in function and structure as the counterpart in the first embodiment. Thus, only the components, portions there of, etc, which are different in structure and/or function from the counterparts in the first embodiment are described.

Figure 10:
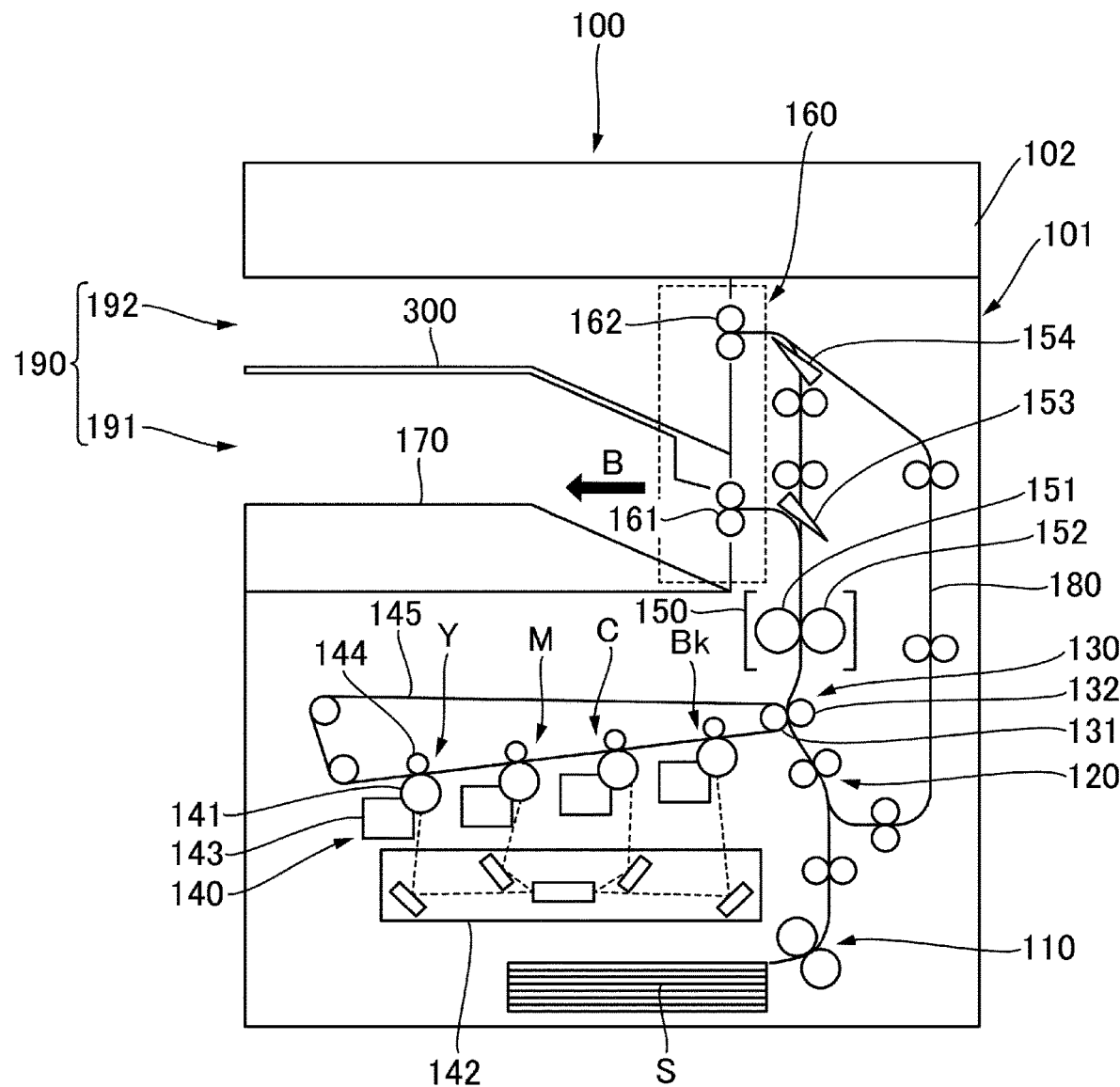
FIG. 10 is a schematic drawing of the image forming apparatus in the second embodiment of the present invention.
Figure 11:
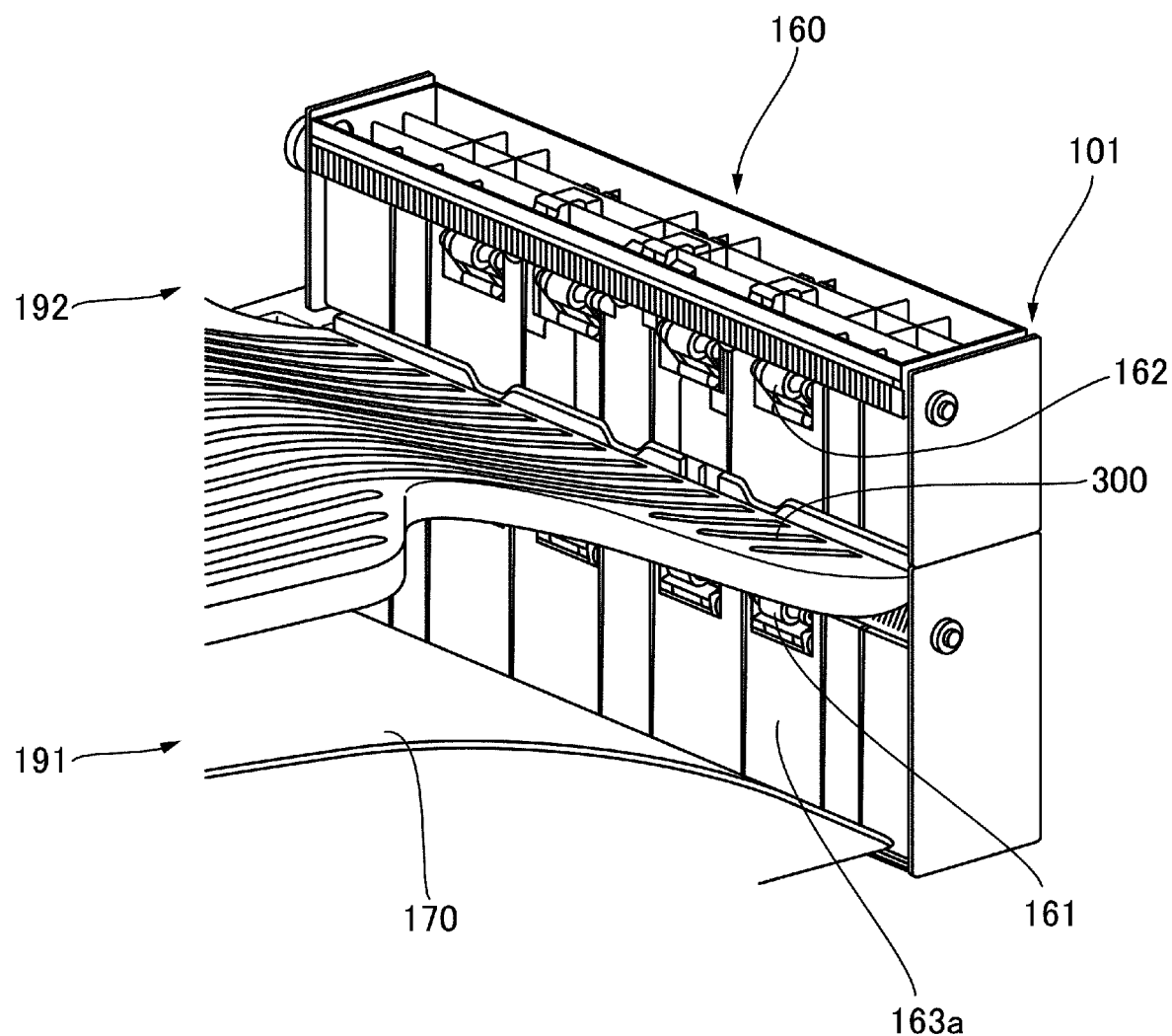
FIG. 11 is a perspective view of the sheet delivery section in the second embodiment.
Figure 12:
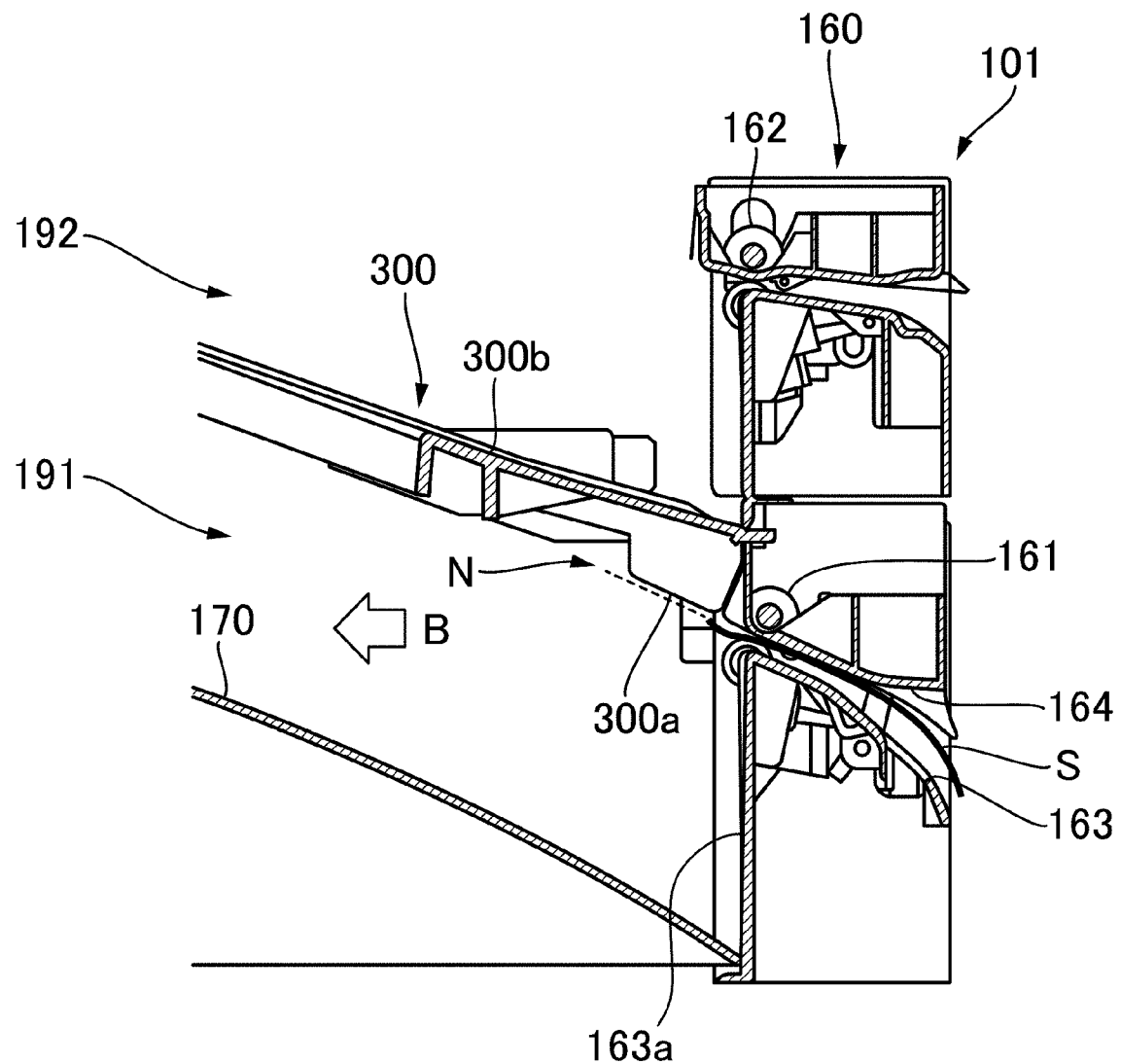
FIG. 12 is a sectional view of the second delivery tray in the second embodiment.

FIG. 10 is a schematic sectional view of the image forming apparatus 100 in this embodiment. It shows the structure of the apparatus 100. FIG. 11 is a perspective view of the delivery section 160 in this embodiment. FIG. 12 is a sectional view of the delivery section 160 in this embodiment.

Referring to FIGS. 10 and 11, the delivery section 160 in this embodiment is provided with a second delivery tray 300, which is positioned on the top side of the delivery tray 170 (which hereafter will be referred to as first delivery tray). The first delivery tray 170 is a sheet supporting first portion in this embodiment. The second delivery tray 300 is a sheet supporting second portion.

The second delivery tray 300 is removably installable between the sheet delivery opening (second delivery opening) of the apparatus main assembly 101, in the adjacencies of which the reversal roller pair 162 is positioned, and the sheet delivery opening, in the adjacencies of which the discharge roller pair 161 is positioned, in terms of the vertical direction. The second delivery tray 300 is positioned so that, as it is seen from above, it extends downstream in terms of the sheet discharge direction B in a manner to overlap with the first delivery tray 170. Therefore, the internal sheet discharge space 190 is divided by the second delivery tray 300, into the first sheet delivery space 191, which is on the top side of the first delivery tray 170, and on the bottom side of the second delivery tray 300, and the second sheet delivery space 192, which is on the top side of the second delivery tray 300, and the bottom side of the image reading apparatus 102.

Further, not only can the reversal roller pair 162 in this embodiment place the sheet S upside down, but also, discharge the sheet S into the second delivery tray 300. That is, the discharge roller pair 161 functions as the first sheet discharging means, and the reversal roller pair 162 functions as the second sheet discharging means. By the way, the portion of the sheet S, which extends out of the apparatus main assembly 100 through the sheet discharging second opening during the sheet reversing operation, is supported by the second delivery tray 300.

Referring to FIG. 12, of the downwardly facing surface of the second delivery tray 300 (opposite surface from sheet supporting surface 300b), the upstream end of the sheet discharge direction B is provided with multiple sheet guiding ribs. These ribs 300a are the same in shape as the ribs, with which the guiding surface 201a in the first embodiment is provided. Further, in terms of the sheet width direction, the area of the downwardly facing surface of the second delivery tray 300, which is provided with the guide ribs 300a, is wider than the widest sheet of recording medium (widest sheet usable, according to specifications) on which an image can be formed by the image forming apparatus 100.

In this embodiment, it is prevented by the guide ribs 300a that when the sheet S is discharged from the apparatus main assembly 100 by the discharge roller pair 161, the rear end of the sheet S moves to the top side of the nip line N as it comes out of the nip of the discharge roller pair 161. That is, in this embodiment, the guide ribs 300a function as the restricting portion, and the second delivery tray 300 functions as the guiding means. Therefore, even in a case where a curled sheet S of recording medium is discharged, it is possible to prevent the occurrence of such problems as the rear end leaning and sheet-to-sheet collision that results in the unsatisfactory stacking of the sheets S in the delivery tray, as it is prevented by the first embodiment.

Further, in this embodiment, in a case where accessories such as the post-processing apparatus 40 (FIG. 9) is installed in the internal sheet discharge space 190, removing the second delivery tray 300 removes the guide ribs 300a which are integral parts of the second delivery tray 300. Therefore, this embodiment makes it easier to install or uninstall accessories than the first embodiment, in which the delivery section 160 was structured so that the extension guide unit 200 and reversal guide 171 had to be separately installed or uninstalled from each other.

By the way, in this embodiment, the guide ribs 300a for restricting the sheet S in the rear end position were parts of the second delivery tray 300. However, other members (for example, downwardly facing surface of reversal guide 171 in first embodiment) may be provided with guide ribs 300a. Further, the guide ribs 300a may be separately made from the second delivery tray 300. In such a case, they may be solidly attached to the second delivery tray 300 with screws or the like. Moreover, the restricting portion is not limited in choice to multiple ribs. For example, each guiding rib may be in the form of such a component that has a surface which extends in the sheet width direction as well as in the sheet discharge direction. A restricting portion which is in the form of a component having such a surface as the one describe above is beneficial in that it can accommodate various sheets which are different in size.

Further, the second delivery tray 300 in this embodiment may be provided with a fullness detection flag and/or rear end pressing flag which are similar to the fullness detection flag 202 and rear end pressing flag 203. Providing the second delivery tray 300 with these flags makes it possible to press downward the rear end of the sheet S as the rear end of the sheet S comes out of the nip of the discharge roller pair 161. Therefore, it makes it possible to more effectively prevent the rear end leaning, sheet-to-collision, etc. Therefore, it can more effectively prevent the occurrence of the unsatisfactory stacking of the sheets S, which is attributable to the rear end leaning and sheet-to-sheet collision.

The embodiments described above makes it possible to prevent the occurrence of the problem that sheets S are unsatisfactory stacked in the delivery tray.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-093912 filed on May 29, 2020, which is hereby incorporated by reference herein in its entirety.

What is claimed is:

1. A sheet discharging apparatus comprising:
a discharging portion provided with a nip portion in which a sheet is nipped, the sheet discharging apparatus being configured to discharge the sheet through the nip portion;
a sheet supporting portion configured to support the sheet discharged by the discharging portion; and
a guide portion provided opposed to an upper surface of the sheet discharged out of the nip portion,
wherein the guide portion includes a fixed restricting portion arranged above an extension line in the sheet discharging direction of the nip portion and configured to restrict a rear end of the sheet with respect to a sheet discharging direction from moving upward and away from the extension line after the sheet passes through the nip portion.

2. A sheet discharging apparatus according to claim 1, wherein the guide portion is attachable to and detachable from a main assembly provided with the discharging portion.

3. A sheet discharging apparatus according to claim 1, wherein the guide portion includes a rotatable member rotatably supported by the restricting portion about a rotational shaft provided upward of the extension line in the sheet discharging direction of the nip portion,
wherein the rotatable member rotates by pressing of the sheet discharged by the discharging portion, and projects downward of the extension line in the sheet discharging direction of the nip portion in a non-contact state with the sheet discharged out of the discharging portion.

4. A sheet discharging apparatus according to claim 3, wherein the rotatable member is configured to contact the sheet supported by the sheet supporting portion and rotate depending on an amount of the sheet supported by the supporting portion, and
wherein the sheet discharging apparatus further comprises a detecting portion configured to change a detecting signal depending on a rotational angel of the rotatable member.

5. A sheet discharging apparatus according to claim 3, wherein in the non-contact state with the sheet to be discharged out of the discharging portion, at least a part of the restriction portion is provided between the nip portion and a portion of the rotatable member contacting the sheet discharged out of the discharging portion with respect to the sheet discharging direction.

6. A sheet discharging apparatus according to claim 1, wherein the guide portion includes a first rotatable member rotatably supported by the restricting portion about the rotational shaft provided upward of the extension line in the sheet discharging direction of the nip portion and a second rotatable member rotatably supported by the restricting portion about the rotational shaft provided upward of the extension line in the sheet discharging direction of the nip portion, wherein the first rotatable member rotates by pressing of the sheet discharged by the discharging portion, and the second rotatable member rotates by pressing of the sheet discharged by the discharging portion and projects downward of the extension line in the sheet discharging direction of the nip portion in a non-contact state with the sheet discharged out of the discharging portion, and wherein the second rotatable member contacts the sheet discharged by the discharging portion upstream of the first rotatable member in the sheet discharging direction.

7. A sheet discharging apparatus according to claim 1, wherein at least a part of the restriction portion extends substantially parallel to the extension line in the sheet discharging direction of the nip portion as viewed in a sheet widthwise direction perpendicular to the sheet discharging direction.

8. A sheet discharging apparatus according to claim 1, wherein the guide portion includes a destaticization member configured to eliminate electric charge from the sheet discharged out of the discharging portion.

9. A sheet discharging apparatus according to claim 8, wherein at least a part of the restriction portion is provided between the nip portion and the destaticization member.

10. A sheet discharging apparatus according to claim 1, wherein when the discharging portion is a first discharging portion, and the discharging apparatus comprises a second discharging portion, and wherein a member provided with the restricting portion of the guide portion includes a supporting surface supporting the sheet discharged out of the second discharging portion.

11. A sheet discharging apparatus according to claim 1, wherein the discharging portion includes a roller pair configured to form the nip portion, and wherein the extension line passes through the nip portion and perpendicularly crosses a line connecting a rotational axis of one roller of the roller pair and a rotational axis of the other roller.

12. A sheet discharging apparatus comprising:
a discharging portion provided with a nip portion in which a sheet is nipped, the discharging portion being configured to discharge the sheet through the nip portion;
a sheet supporting portion configured to support the sheet discharged by the discharging portion; and
a fixed restricting portion provided opposed to an upper surface of the sheet fed out of the nip portion and configured to restrict a rear end of the sheet with respect to a sheet discharging direction from moving upward and away from an extension line in the sheet discharging direction of the nip portion after the sheet passes through the nip portion;
wherein the restricting portion is removable from a main assembly of sheet discharging apparatus, and wherein, in a state in which the restricting portion is removed from the main assembly, a sheet processing apparatus configured to process the sheet discharged out of the discharging portion is attachable to the main assembly.

13. A sheet discharging apparatus according to claim 12, further comprising a rotatable member rotatably supported by the restricting portion about a rotational shaft provided upward the extension line in the sheet discharging direction of the nip portion, and wherein, in a state in which the restricting portion and rotatable member are removed from the main assembly, the sheet processing apparatus is attachable to the main assembly.

14. A sheet discharging apparatus according to claim 12, wherein at least a part of the restriction portion extends substantially parallel to the extension line in the sheet discharging direction of the nip portion as viewed in a sheet widthwise direction perpendicular to the sheet discharging direction.

15. A sheet discharging apparatus according to claim 12, wherein the guide portion includes a destaticization member configured to eliminate electric charge from the sheet discharged out of the discharging portion.

16. A sheet discharging apparatus according to claim 15, wherein at least a part of the restriction portion is provided between the nip portion and the destaticization member.

17. A sheet discharging apparatus according to claim 12, wherein in a non-contact state with the sheet to be discharged out of the discharging portion, at least a part of the restriction portion is provided between the nip portion and a portion of the rotatable member contacting the sheet discharged out of the discharging portion with respect to the sheet discharging direction.

18. An image forming apparatus comprising:
an image forming portion configured to form an image on a sheet;
a discharging portion provided with a nip portion in which the sheet on which the image is formed by the image forming apparatus is nipped, the discharging portion being configured to discharge the sheet through the nip portion;
a sheet supporting portion configured to support the sheet discharged by the discharging portion; and
a fixed restricting portion provided opposed to an upper surface of the sheet discharged out of the nip portion, the fixed restricting portion being configured to restrict a rear end of the sheet with respect to a sheet discharging direction from moving upward and away from an extension line in the sheet discharging direction of the nip portion after the sheet passes through the nip portion, and
wherein the restricting portion is attachable to and detachable from a main assembly of the image forming apparatus, and
wherein, in a state in which the restricting portion is removed from the main assembly, a sheet processing apparatus configured to process the sheet discharged out of the discharging portion is attachable to said main assembly.

19. An image forming apparatus according to claim 18, wherein the image forming apparatus includes an image bearing member, a transferring portion configured to transfer a toner image formed on the image bearing member to an image surface of the sheet, and a fixing portion configured to fix the toner image transferred to the image surface by heating, and wherein the sheet discharging apparatus discharges the sheet with the image surface thereof facing downward.

20. An image forming apparatus according to claim 18, further comprising a rotatable member rotatably supported by the restricting portion about a rotational shaft provided upward of the extension line in the sheet discharging direction of the nip portion, wherein the rotatable member rotates by pressing of the sheet discharged by the discharging portion, and projects downward of the extension line in the sheet discharging direction of the nip portion in a non-contact state with the sheet discharged out of the discharging portion.

21. An image forming apparatus according to claim 18, wherein the discharging portion includes a roller pair configured to form the nip portion, and wherein the extension line passes through the nip portion and perpendicularly crosses a line connecting a rotational axis of one roller of the roller pair and a rotational axis of the other roller.

22. An image forming apparatus according to claim 21, wherein the fixed restricting portion is arranged above the extension line.

23. An image forming apparatus according to claim 18, further comprising:

a first rotatable member rotatably supported by the restricting portion about the rotational shaft provided upward of the extension line in the sheet discharging direction of the nip portion; and a second rotatable member rotatably supported by the restricting portion about the rotational shaft provided upward of the extension line in the sheet discharging direction of the nip portion, wherein the first rotatable member rotates by pressing of the sheet discharged by the discharging portion, and the second rotatable member rotates by pressing of the sheet discharged by the discharging portion and projects downward of the extension line in the sheet discharging direction of the nip portion in a non-contact state with the sheet discharged out of the discharging portion, and wherein the second rotatable member contacts the sheet discharged by the discharging portion upstream of the first rotatable member in the sheet discharging direction.

24. An image forming apparatus according to claim 18, wherein at least a part of the restriction portion extends substantially parallel to the extension line in the sheet discharging direction of the nip portion as viewed in a sheet widthwise direction perpendicular to the sheet discharging direction.

25. An image forming apparatus according to claim 18, further comprising a rotatable member rotatably supported by the restricting portion about a rotational shaft provided upward of the extension line in the sheet discharging direction of the nip portion, wherein the rotatable member rotates by pressing of the sheet discharged by the discharging portion, and projects downward of the extension line in the sheet discharging direction of the nip portion in a non-contact state with the sheet discharged out of the discharging portion.

26. An image forming apparatus according to claim 25, wherein, in the non-contact state with the sheet to be discharged out of the discharging portion, at least a part of the restriction portion is provided between the nip portion and a portion of the rotatable member contacting the sheet discharged out of the discharging portion with respect to the sheet discharging direction.

* * * * *